United States Patent [19]

Ogura et al.

[11] Patent Number: 4,920,431
[45] Date of Patent: Apr. 24, 1990

[54] IMAGE READING APPARATUS WITH JAM-PREVENTION FEATURE

[75] Inventors: Makoto Ogura; Tatsundo Kawai; Katsuhiko Yamada, all of Hiratsuka; Shinichi Seito, Isehara, all of Japan

[73] Assignee: Canon Kabushiki Kaisha, Tokyo, Japan

[21] Appl. No.: 144,644

[22] Filed: Jan. 11, 1988

Related U.S. Application Data

[63] Continuation of Ser. No. 751,128, Jul. 2, 1985, abandoned.

[30] Foreign Application Priority Data

Jul. 14, 1984 [JP] Japan .................. 59-145256
Jul. 31, 1984 [JP] Japan .................. 59-158659

[51] Int. Cl.⁵ .................. H04N 1/12; H04N 1/028
[52] U.S. Cl. .................. 358/496; 358/474; 358/498
[58] Field of Search .......... 358/293, 294, 285, 256, 358/471, 474, 494, 496, 498

[56] References Cited

U.S. PATENT DOCUMENTS

| | | | |
|---|---|---|---|
| 4,124,295 | 11/1978 | Gardiner | 355/68 |
| 4,405,227 | 9/1983 | Inoue et al. | 355/27 |
| 4,408,230 | 10/1983 | Tamura et al. | 358/293 |
| 4,446,364 | 5/1984 | Hayashi et al. | 358/293 |
| 4,471,384 | 9/1984 | Sato et al. | 358/293 |
| 4,475,128 | 10/1984 | Koumura | 358/293 |
| 4,496,984 | 1/1985 | Stoffel | 358/293 |
| 4,496,988 | 1/1985 | Moriguchi et al. | 358/294 |
| 4,542,414 | 9/1985 | Nagane | 358/293 |
| 4,558,373 | 12/1985 | Plasencia et al. | 358/293 |
| 4,602,293 | 7/1986 | Sekine | 358/294 |
| 4,622,594 | 11/1986 | Honjo et al. | 358/293 |
| 4,662,738 | 5/1987 | Kasuya | 355/14 R |
| 4,768,100 | 8/1988 | Kunishima et al. | 358/293 |

FOREIGN PATENT DOCUMENTS

| | | | |
|---|---|---|---|
| 52-43313 | 4/1977 | Japan | 358/294 |
| 53-72517 | 6/1978 | Japan | 358/294 |
| 53-103315 | 9/1978 | Japan | 358/294 |
| 54-33613 | 3/1979 | Japan | 358/294 |
| 57-203368 | 12/1982 | Japan | 358/293 |
| 57-211870 | 12/1982 | Japan | 358/294 |
| 59-210766 | 11/1984 | Japan | 358/293 |
| 60-194659 | 10/1985 | Japan | 358/293 |

OTHER PUBLICATIONS

D. W. Baxter, "Scanner Using Linear Array of Light-Emitting Diodes", *IBM Technical Disclosure Bulletin*, vol. 15, No. 1, Jun. 1972, p. 4.

*Primary Examiner*—James J. Groody
*Assistant Examiner*—Randall S. Svihla
*Attorney, Agent, or Firm*—Fitzpatrick, Cella, Harper & Scinto

[57] ABSTRACT

There is an image reading apparatus for use in a facsimile apparatus, a copying machine or the like. This apparatus illuminates the light from a light source such as an LED array onto an original which is conveyed by a conveying device and thereby reading an image data on the original. To smoothly guide the edge of the original, an original guiding device which guides the original non-rippingly is provided downstream of the position where the original is read in the original conveying direction by the conveying device. As an original guiding device, a flat or concave guide surface, a flat or concave notch, original guide rollers, a guide member having a concave surface, or the like is provided. The guiding device may if desired be light-reflective.

17 Claims, 10 Drawing Sheets

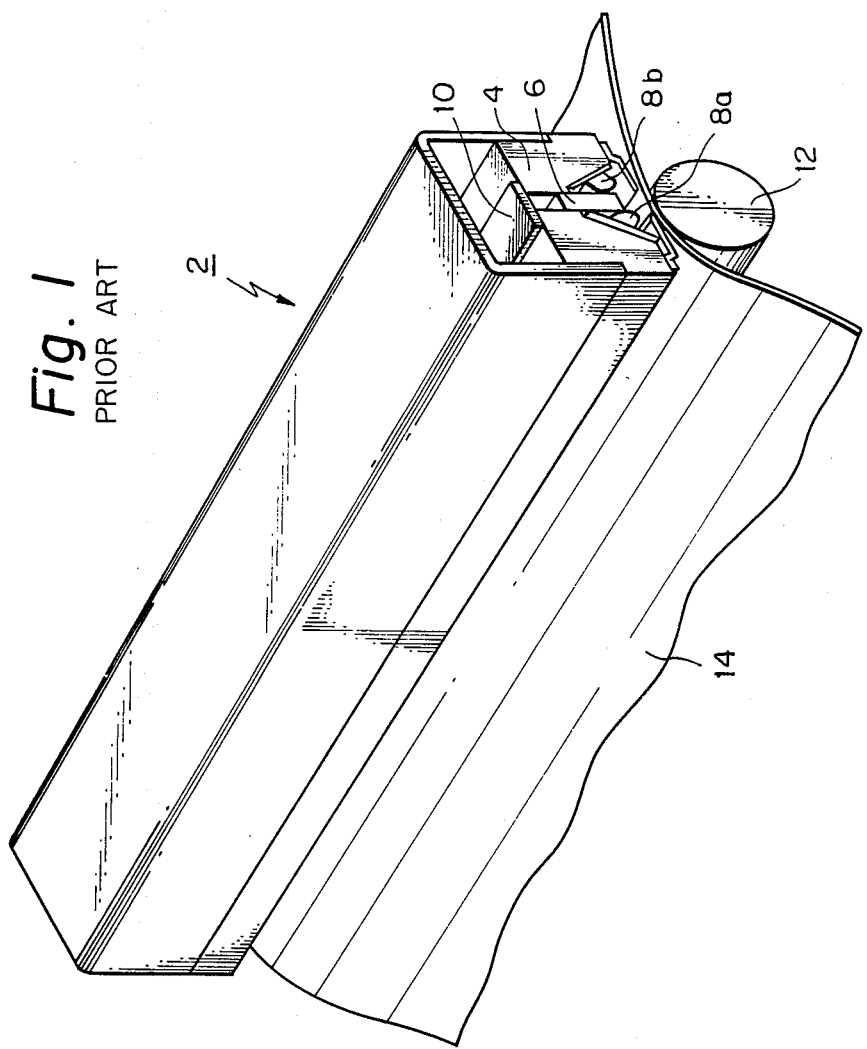

IMAGE READING APPARATUS WITH JAM-PREVENTION FEATURE

This application is a continuation of application Ser. No. 751,128 filed July 2, 1985, now abandoned.

BACKGROUND OF THE INVENTION

1. Field of the Invention

The present invention relates to an image reading apparatus for use in a facsimile apparatus, a copying machine, an optical symbol reading apparatus, or the like and, more particularly, to an image reading apparatus having an excellent conveying efficiency of an original.

2. Description of the Prior Art

Hitherto, an image reading apparatus for use in a facsimile apparatus or the like has an arrangement such as illustrated in, for example, FIG. 1. Practically speaking, a refractive index distributed type lens array 6 (hereinafter, referred to simply as a lens array) is attached to a box 4 of an image reading apparatus 2, and LED arrays 8a and 8b serving as light sources are arranged on both sides of the lens array 6, and a photoelectric converting device array 10 serving as photosensing means is provided at the top of the box 4. A roller 12 is also provided to convey an original 14.

The light beams emitted from the LED arrays 8a and 8b are scattered and reflected by the original 14. The reflected lights are focused onto the photoelectric converting device array 10 by the lens array 6 and are converted to an electric signal, so that the image data on the original 14 is read out.

However, in such an image reading apparatus 2, to obtain a sufficient amount of light upon reading of the image, the LED arrays 8a and 8b are arranged on both sides of the lens array 6 so as to sandwich it and the original is illuminated by these two LED arrays 8a and 8b. Therefore, there is a drawback that when the original 14 is read, the edge of the original 14 comes into contact with the LED array 8b arranged on the paper discharge side, so that this causes what is called a jam state such that the original cannot be conveyed. FIGS. 2A to 2E are cross sectional views of the image reading apparatus 2 showing the occurrence of such a jam state. In these drawings, a reference numeral 16 denotes a paper pressing tool, 18 is an optical axis of the lens array 6, and 20 is a position where the original is read.

In FIG. 2A, the edge of the original 14 is led into the image reading apparatus 2 and then reaches the reading position 20 as shown in FIG. 2B. At this time, the edge of the original 14 may in some instance be peeled off from the roller 12 and be obliquely and upwardly moved as shown in FIG. 2C, depending on the quality or state of the original paper 14. If the original 14 is further conveyed in such a state, the edge of the original 14 is come into contact with the LED array 8b arranged on the paper discharge side as shown in FIG. 2D. Moreover, it becomes impossible to convey the original 14, as shown in FIG. 2E, or the paper conveying state becomes abnormal.

FIGS. 3 and 4 show a second example of such a kind of conventional image reading apparatus. In the diagrams, M denotes an original; a numeral 301 is a conveying roller formed of, for example, rubber to convey the original M in the direction indicated by an arrow; 301A is an axis rotatably supported at predetermined position relative to the main body of the apparatus; and 303 is a reading section provided at a position opposite to the conveying roller 301. The reading section 303 comprises: a leaf spring 305 serving as a pressing member for elastically pressing the original M onto the roller 301 over the whole width of the original; an LED array 307 serving as illumination means for illuminating the original M; a focusing light transmission array 309 to focus the reflected lights from the original M; a converting section 311 provided with photoelectric converting devices for photoelectric converting the focused light; a guide member 312, arranged downstream in the conveying direction of the original, for guiding the edge $M_1$ of the original to smoothly perform the removal of the original from the reading position; and a supporting member 313 to support these respective parts.

The edge $M_1$ of the original M pressed onto the conveying roller 301 by the leaf spring 305 is guided by the guide member 312 and is conveyed in the direction of the arrow f as indicated by the broken line in FIG. 4 in association with the rotation of the conveying roller 301 by way of drive means (not shown) for driving this roller. During this process, the surface of the original is illuminated by the LED array 307 and the reflected light is supplied to the photoelectric converting section 311 through the focusing light transmission array 309, so that the image on the original M is sequentially read.

However, in such an image reading apparatus, it is desirable to closely arrange the leaf spring 305 and guide member 312, but the arrangement of these members cannot be entirely arbitrary, because it is necessary to consider both the optical path of the illumination light from the LED array 307 and the optical path of the reflected light to the focusing light transmission array 309. Specifically, it is undesirable to allow an edge 312A of the guide member 312 to be arranged long on the side of the leaf spring 305.

Accordingly, in such an image reading apparatus, it is difficult to assure the complete conveyance of the original M by the guide member 312. In dependence on the inserting state of the original edge $M_1$ to the side of the reading section 303, the edge can be rolled inside of the reading section 303, so that there is a problem that the abnormal conveyance of the original is likely to occur.

SUMMARY OF THE INVENTION

It is an object of the present invention to provide an image reading apparatus in which an original can be always stably conveyed irrespective of the quality of the original paper, or of the bending or warp state of the original.

Another object of the invention is to provide an image reading apparatus in which an original can be certainly conveyed independently of the inserting state of the edge of the original.

According to the present invention these objects are attained by providing an image reading apparatus for reading an image on an original which is conveyed by conveying means by illuminating the light from a light source onto the original, in which original guiding means for non-nippingly guiding the edge of the original is provided downstream of the reading position in the conveying direction by the conveying means.

BRIEF DESCRIPTION OF THE DRAWINGS

FIGS. 1 and 2A to 2E are a perspective view and cross sectional views respectively showing an example of a conventional image reading apparatus;

DETAILED DESCRIPTION OF THE PREFERRED EMBODIMENTS

The present invention will now be described in detail with reference to the drawings.

Figure 2A:
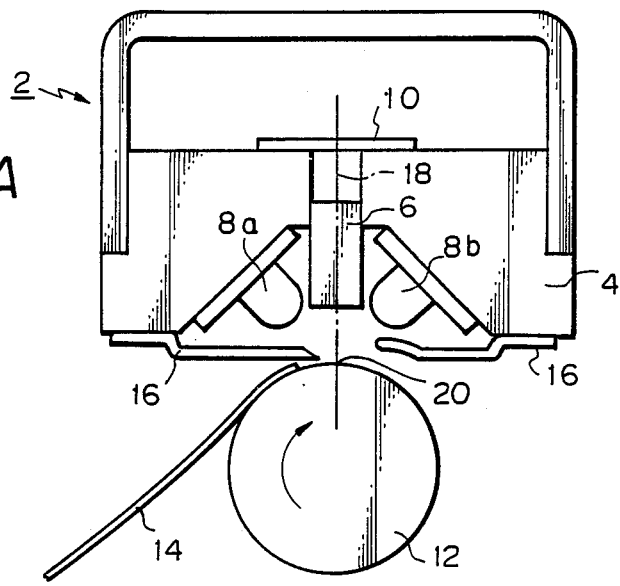
Figure 2B:
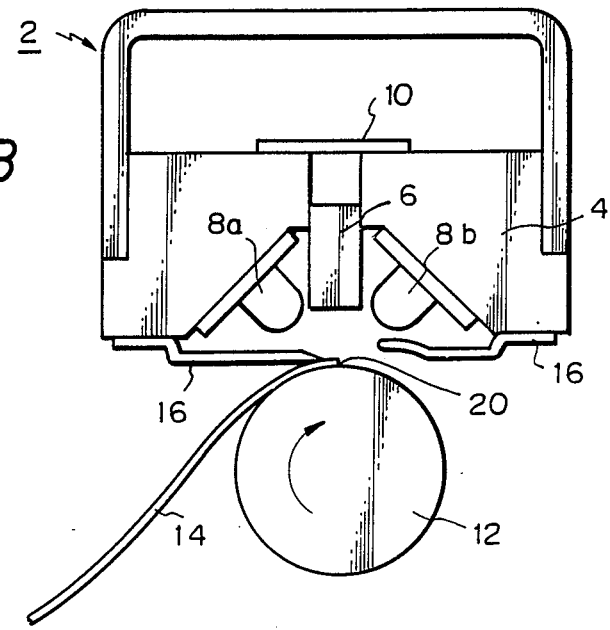
Figure 2C:
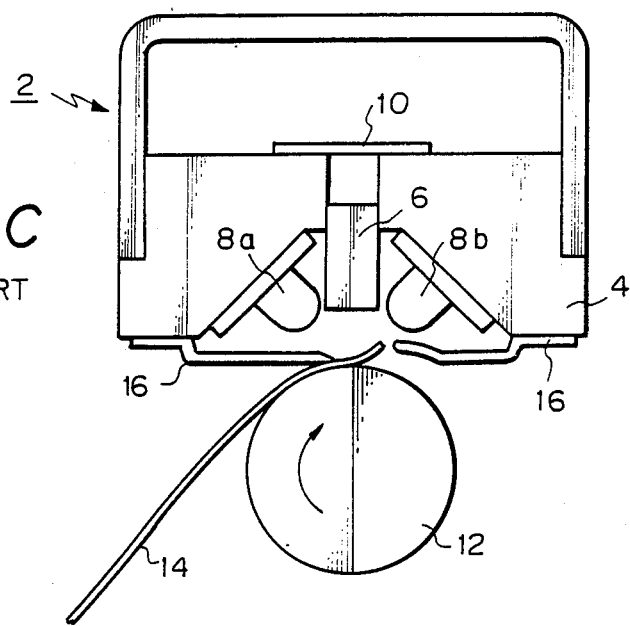
Figure 2D:
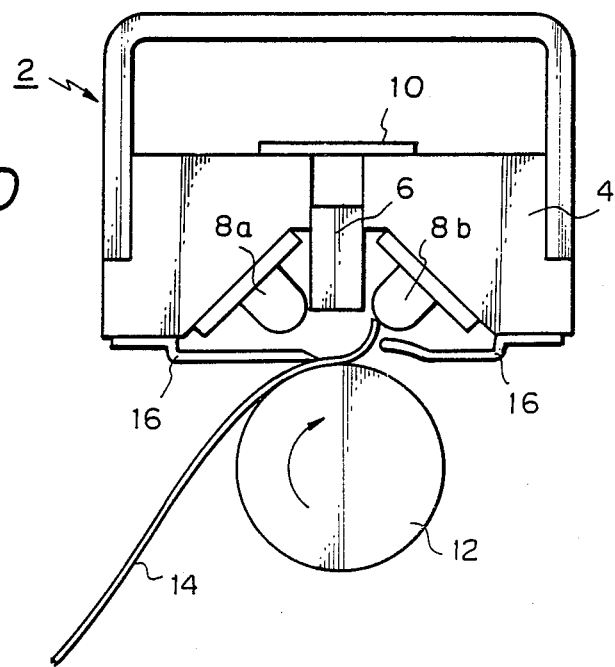
Figure 2E:
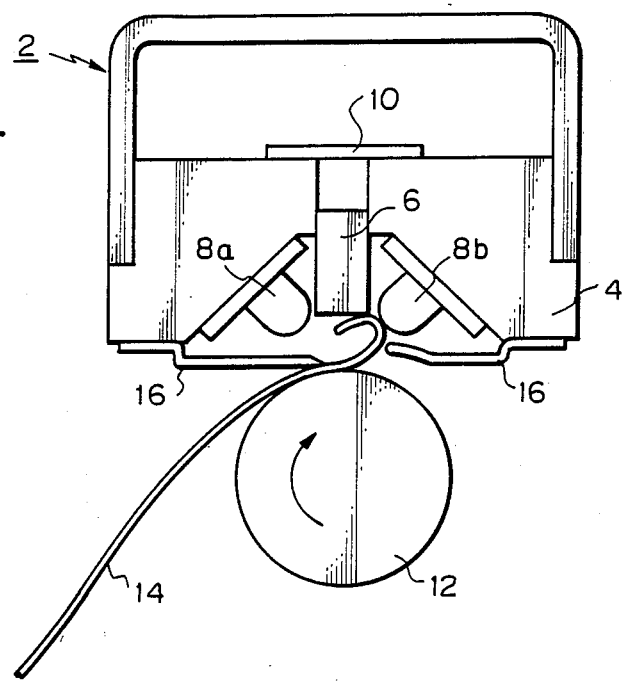
Figure 4:
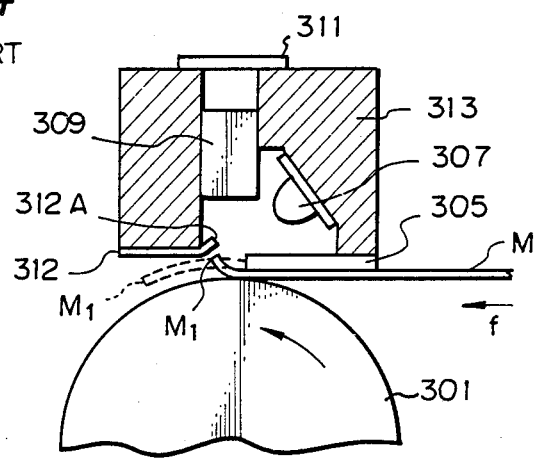
FIGS. 3 and 4 are a perspective view and a side elevational view showing another example of a conventional image reading apparatus.
Figure 3:
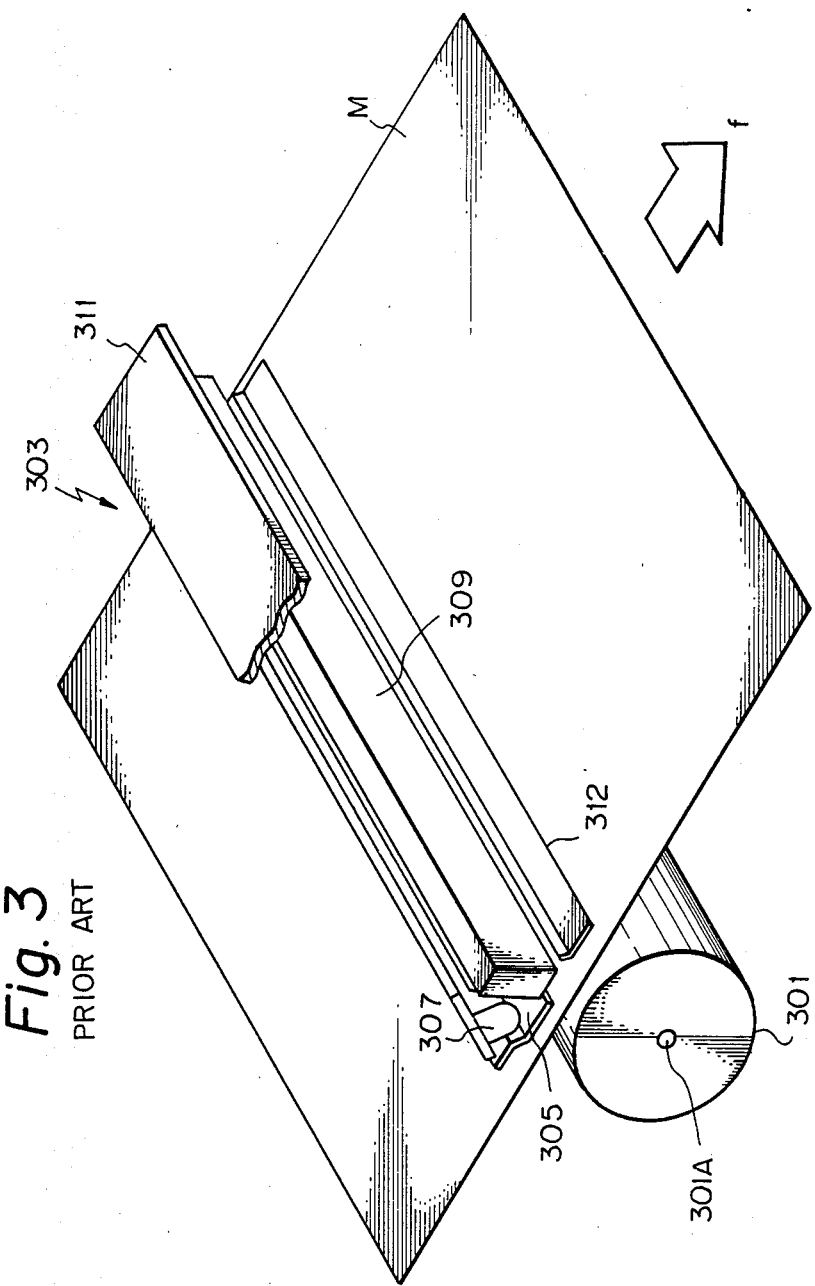
Figure 5:
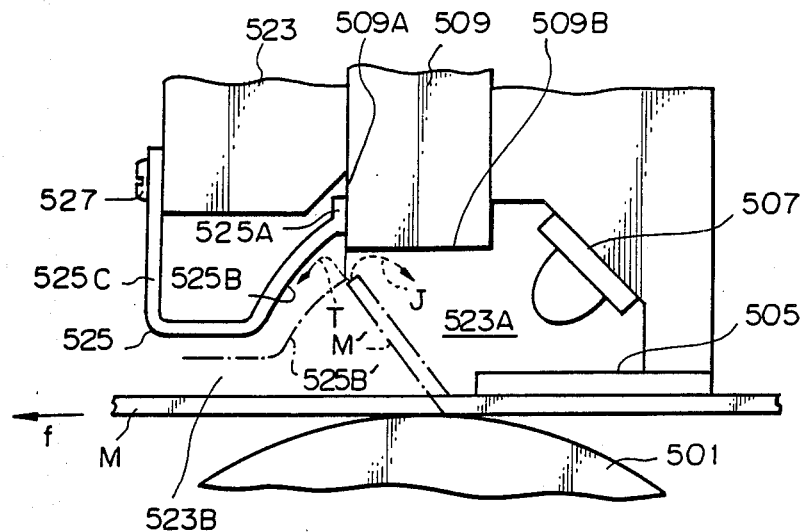
FIGS. 5, 6, 7A–7E, 8 and 9 are cross sectional views showing examples of arrangements of image reading apparatuses according to the present invention, respectively.

FIG. 5 shows an example of an arrangement of the main part of an image reading apparatus according to the first embodiment of the invention. A reference numeral 501 is a conveying roller and 505 is a leaf spring.

In this embodiment, a guide member 525 serving as original guiding means is provided. This guide member has: a portion 525A which is in contact with a downstream side surface 509A in the direction indicated by an arrow f of a focusing light transmission array 509; a portion 525B, arranged from the portion 525A toward an outlet 523B where the original M is discharged, for guiding the original M; and a portion 525C fixed to a supporting member 523 by means of a screw 527. In this case, by allowing the portion 525A to come into contact with the side surface 509A, it is possible to prevent the original M from entering the gap between the guide member 525 and the focusing light transmission array 509.

On one hand, it is desirable to form the portion 525B such that it becomes the flat or concave surface with respect to an inside 523A of a supporting member 523, thereby allowing the original M to be smoothly guided toward the outlet 523B. In the embodiment of FIG. 5, the portion 525B is formed to have a concave surface facing the moving original M.

In addition, it is desirable that the edge of the portion 525B on the side of the side surface 509A be arranged at a position slightly above the edge surface 509B of the focusing light transmission array 509 on the original M side and that the concave surface of the portion 525B be located backward of the edge surface 509B, i.e., downstream of surface 509B in the original-conveyance direction. This is because if the edge of a portion 525B' (as indicated by an alternate long and short dash line in FIG. 5) on the side of the side surface 509A is arranged nearer the approaching original M than the edge surface 509B of the array 509, an original (as shown at M') can be rolled into the inside 523A of the reading section as shown by an arrow J, depending on the position where the edge of the original M' hits the portion 525B', and abnormal conveyance (jam) can be caused. On the other hand, according to the embodiment of FIG. 5, the edge of the original M' is guided to the portion 525B as indicated by an arrow T and no jam will be caused.

Further, by providing a reflecting surface such as a mirror or the like for the surface of the portion 525B, the light reflected from an LED array 507 to the side of the portion 525B through the reading portion are again reflected by the reflecting surface and are returned to the reading portion of the original M, thereby making it possible to increase the illuminance in this portion. In this case, it is particularly preferable to form the surface of the portion 525B flat or concave.

Figure 6:
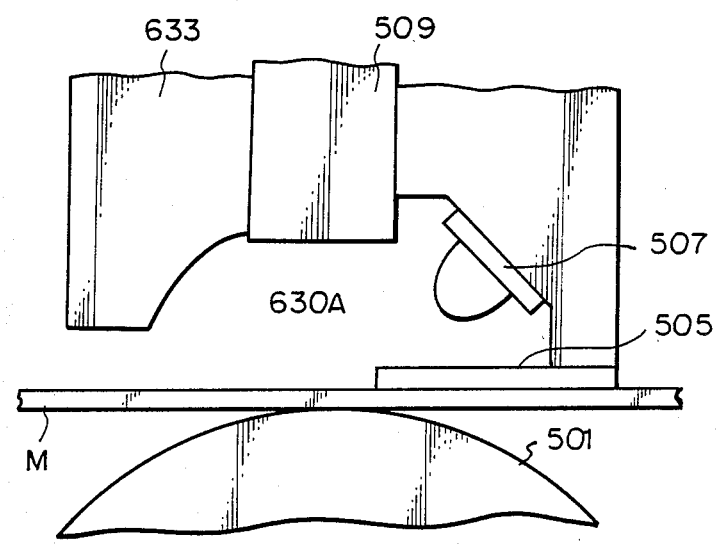

FIG. 6 shows another exemplary arrangement of the main part of an image reading apparatus according to the second embodiment of the invention. In this embodiment, a supporting member 633 itself is provided with a reading portion 630A formed with the portion having a shape similar to the guide member 525 serving as the original guiding means in FIG. 5. With this embodiment, function and effect similar to those in the first embodiment shown in FIG. 5 can be attained. In this way, the guide member as the original guiding means can obviously adopt various kinds of forms.

FIGS. 7A to 7E are cross sectional views of an image reading apparatus 702 according to the third embodiment of the invention. A lens array 706 is arranged substantially in the central portion of a box 704. A photoelectric converting device array 710 serving as photosensing means is provided on the top surface of the box 704 so as to be located on an optical axis 718 of the lens array 706. A numeral 712 denotes a roller to convey an original 714; 716 is a paper pressing tool; and 720 is a position where the original 714 is read. As shown in the diagrams, in this embodiment, a notch 722 serving as original guiding means is formed in the box 704 on the backward side of the reading position 720 of the original 714 with regard to the conveying direction of the original 714. A numeral 708 is an LED array.

Figure 7A:
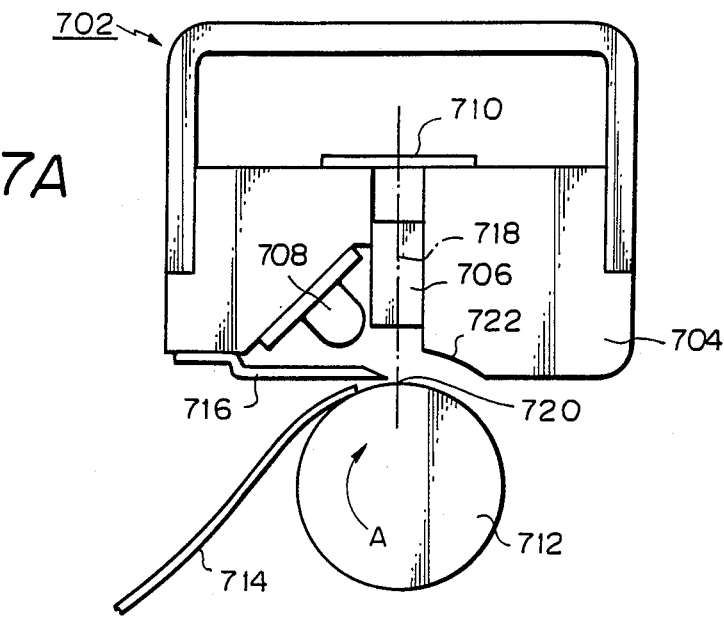
Figure 7B:
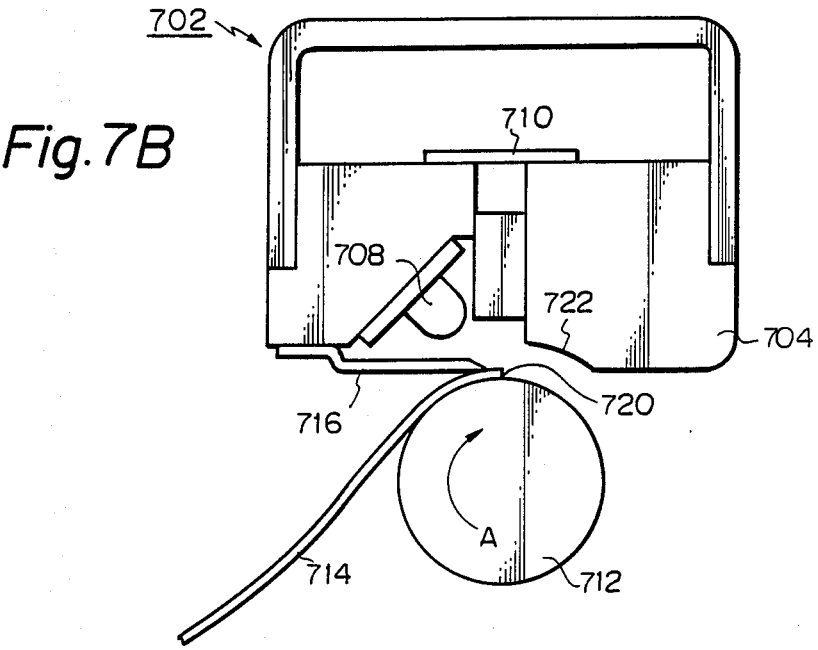
Figure 7C:
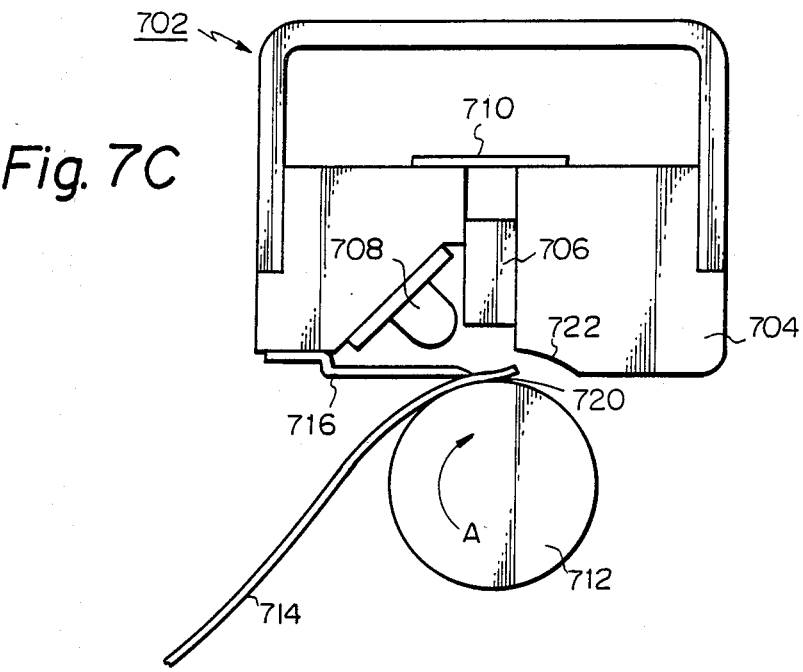
Figure 7D:
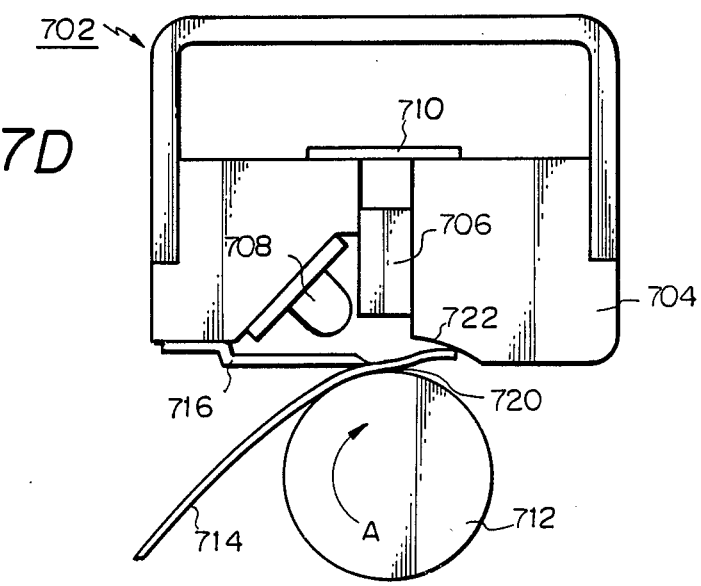
Figure 7E:
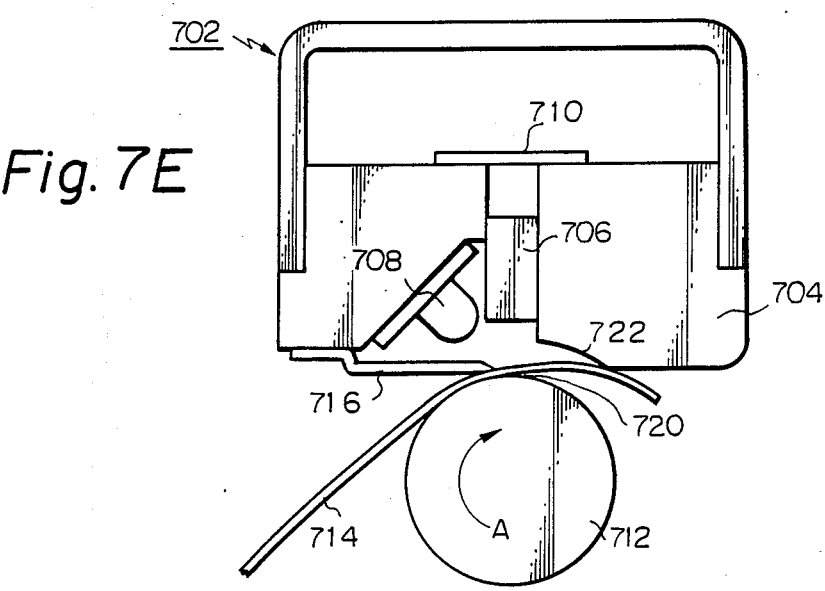

The operation will now be explained. When the original 714 is conveyed due to the rotation in the direction indicated by an arrow A of the roller 712, the edge of the original 714 shown in FIG. 7A is moved to the reading position 720 as shown in FIG. 7B. Then, the edge is obliquely and upwardly peeled off as shown in FIG. 7C. However, it is guided by the notch 722 formed in the box 704 as shown in FIG. 7D, so that the original is conveyed normally, as shown in FIG. 7E.

Figure 8:
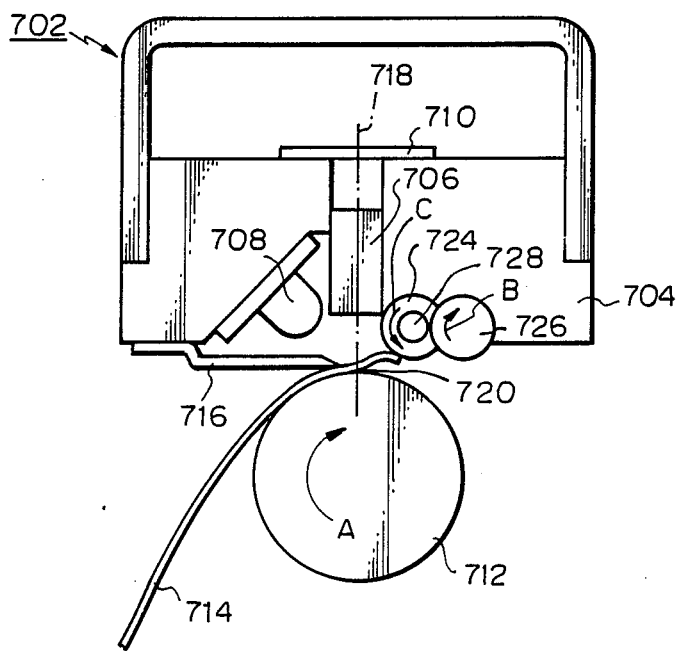

FIG. 8 is a cross sectional view of an image reading apparatus according to the fourth embodiment of the invention. A feature of the fourth embodiment is that a first roller 724 and a second roller 726 are arranged to the box 704 on the backward side of the reading position 720 of the original 714 in the original conveying direction. A small roller 728 is coaxially provided in the first roller 724. The small roller 728 is slidably in contact with the second roller 726. The second roller 726 is in contact through another roller (not shown) with the roller 712 to convey the original. Therefore, when the roller 712 is rotated in the direction of the arrow A in FIG. 8, the second roller 726 is rotated in the direction of an arrow B, while the first roller 724 is rotated in the direction of an arrow C, respectively.

In this case, the linear velocity of the surface of the first roller 724 is higher than the linear velocity of the surface of the second roller 726. The edge of the original 714 inserted is guided on the paper discharge side by the first roller 724. Thus, even if the edge of the original is peeled off, no abnormal conveyance occurs.

Figure 9:
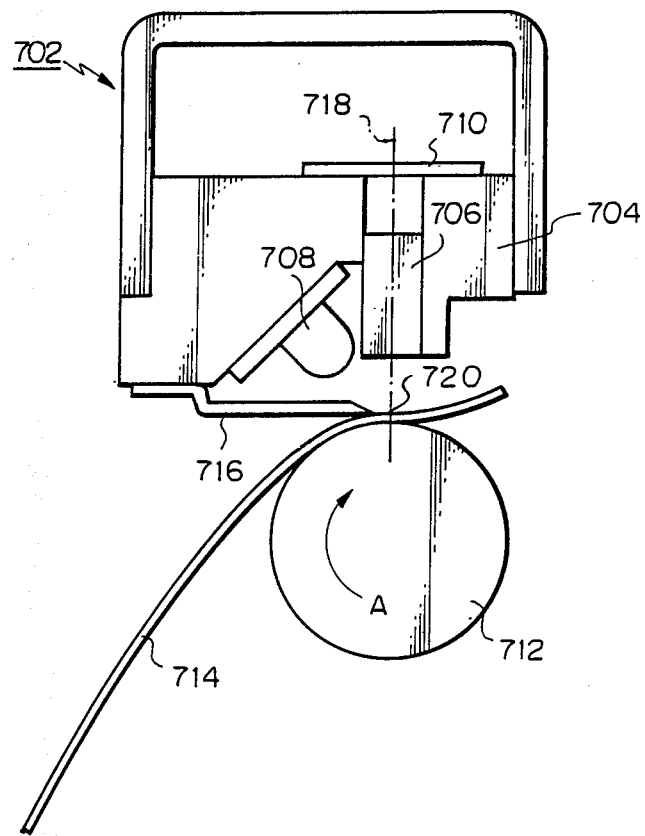

FIG. 9 is a cross sectional view of an image reading apparatus according to the fifth embodiment of the invention. A feature of the fifth embodiment is that the box 704 on the backward side of the reading position 720 of the original 714 in the original conveying direction is formed so as to become especially small. With this constitution, even if the edge of the original is peeled off, it does not come into contact with any portion of the image reading apparatus 702, so that no abnormal conveyance occurs.

In the foregoing first to fifth embodiments, by selecting the waveform range of the light emitted from the LED array as a light source to be yellow or by reducing the drive duty of the LED array, even if only a single LED array for illumination of the original is used, sufficient illuminance on the original surface can be obtained. However, to further improve the illuminance on the original surface, it is also apparently possible to adopt an arrangement such that two or more LED arrays are provided on the forward side of the original reading position with regard to the original conveying direction.

As described above, according to the present invention, the original guiding means, which non-nippingly guides the original, is provided in the portion from the downstream side surface in the original conveying direction toward the outlet side of the original in the reading section, so that the original can be certainly conveyed irrespective of the inserting state of the edge of the original to be conveyed into the reading section. Further, even if the edge of the original is peeled off when the original of an unfavorable paper quality or condition is read, the original can be always stably conveyed. Consequently, it is possible to realize an image reading apparatus having a high reliability in which no abnormal conveyance occurs.

What is claimed is:

1. An image reading apparatus for reading an original conveyed along a predetermined path by a conveying means having a roller provided adjacent a predetermined reading position, said apparatus comprising:
   means for reading a portion of the original located at the predetermined reading position in the predetermined path;
   a light source for illuminating the portion of the original located at said predetermined reading position; and
   original guiding means provided at a side of said means for reading and downstream of said predetermined reading position along the predetermined path along which the conveying means conveys the original;
   wherein said original guiding means is so disposed and so shaped that it non-nippingly guides the leading edge of the original being conveyed to prevent the leading edge of the original from catching on and being jammed by said original guiding means; and
   wherein said original guiding means comprises a guide surface which is non-convex as seen from said predetermined reading position.

2. An image reading apparatus according to claim 1, wherein said non-convex guide surface reflects light.

3. An image reading apparatus according to claim 1, wherein said roller is provided at a position opposite to said means for reading.

4. An image reading apparatus for reading an original conveyed along a predetermined path by a conveying means having a roller provided adjacent a predetermined reading position, said apparatus comprising:
   means for reading a portion of the original located at the predetermined reading position in the predetermined path;
   a light source for illuminating the portion of the original located at said predetermined reading position; and
   original guiding means provided downstream of said predetermined reading position along the predetermined path along which the conveying means conveys the original;
   wherein said original guiding means is so disposed and so shaped that it non-nippingly guides the leading edge of the original being conveyed to prevent the leading edge of the original from catching on and being jammed by said original guiding means; and
   wherein said original guiding means is defined by a notch formed in said portion of said apparatus.

5. An image reading apparatus according to claim 4, wherein said roller is provided at a position opposite to said means for reading.

6. An image reading apparatus for reading an original conveyed by a conveying means along a predetermined path, said apparatus comprising:
   means for reading a portion of the original located at a predetermined reading position in the predetermined path;
   a light source for illuminating the portion of the original located at said predetermined reading position; and
   original guiding means provided downstream of said predetermined reading position along the predetermined path along which the conveying means conveys the original;
   wherein said apparatus has a portion located downstream along the predetermined path from said predetermined reading position and out of the predetermined path, said portion being so positioned and so shaped that the leading edge of the original being conveyed past said predetermined reading position by the conveying means could catch on and be jammed by said portion if not prevented from doing so;
   wherein said original guiding means is so disposed and so shaped that it non-nippingly guides the leading edge of the original being conveyed to prevent the leading edge of the original from catching on and being jammed by said portion of said apparatus; and
   wherein said original guiding means comprises an original guide roller which non-nippingly guides the original.

7. An image reading apparatus according to claim 6, wherein said original guide roller is rotatably driven such that the surface of said original guide roller moves with a greater linear speed than the speed with which the conveying means conveys the original along the predetermined path and past said predetermined reading position.

8. An image reading apparatus according to claim 7, wherein said original guiding means further comprises a second roller and said rollers are arranged such that said second roller is driven by the conveying means and in turn drives said original guide roller.

9. An image reading apparatus for reading an original conveyed along a predetermined path by a conveying means having a roller provided adjacent a predetermined reading position, said apparatus comprising:
   means for reading a portion of the original located at the predetermined reading position in the predetermined path;
   a light source for illuminating the portion of the original located at said predetermined reading position; and
   original guiding means provided downstream of said predetermined reading position along the predetermined path along which the conveying means conveys the original;
   wherein said original guiding means is so disposed and so shaped that it non-nippingly guides the leading edge of the original being conveyed to prevent the leading edge of the original from catching on and being jammed by said original guiding means; and wherein said original guiding means comprises a guide member having a concave surface as seen from said predetermined reading position.

10. An image reading apparatus according to claim 9, wherein said concave surface reflects light.

11. An image reading apparatus according to claim 9, wherein said roller is provided at a position opposite to said means for reading.

12. An image reading apparatus for reading an original conveyed along a predetermined path by a conveying means having a roller provided a predetermined reading position, said apparatus comprising:

means for reading a portion of the original located at the predetermined reading position in the predetermined path;

a light source for illuminating the portion of the original located at said predetermined reading position; and original guiding means provided downstream of said predetermined reading position along the predetermined path along which the conveying means conveys the original;

wherein said apparatus has an original discharge zone through any portion of which the original passes when being discharged;

wherein said apparatus has a portion which extends into the original discharge zone;

wherein said original guiding means is so disposed and so shaped that it non-nippingly guide the leading edge of the original being conveyed to prevent the leading edge of the original from catching on and being jammed by said portion of said apparatus; and wherein said original guiding means comprises a guide surface which is non-convex as seen from said predetermined reading position.

13. An image reading apparatus according to claim 12, wherein said roller is provided at a position opposite to said means for reading.

14. An image reading apparatus for reading an original conveyed along a predetermined path by a conveying means having a roller provided a predetermined reading position, said apparatus comprising:

means for reading a portion of the original located at the predetermined reading position in the predetermined path;

a light source for illuminating the portion of the original located at said predetermined reading position; and original guiding means provided downstream of said predetermined reading position along the predetermined path along which the conveying means conveys the original;

wherein said apparatus has an original discharge zone through any portion of which the original passes when being discharged;

wherein said apparatus has a portion which extends into the original discharge zone;

wherein said original guiding means is so disposed and so shaped that it non-nippingly guides the leading edge of the original being conveyed to prevent the leading edge of the original from catching on and being jammed by said portion of said apparatus; and wherein said original guiding means is defined by a notch formed in said portion of said apparatus.

15. An image reading apparatus according to claim 14, wherein said roller is provided at a position opposite to said means for reading.

16. An image reading apparatus for reading an original conveyed along a predetermined path by a conveying means having a roller provided a predetermined reading position, said apparatus comprising:

means for reading a portion of the original located at the predetermined reading position in the predetermined path;

a light source for illuminating the portion of the original located at said predetermined reading position; and original guiding means provided downstream of said predetermined reading position along the predetermined path along which the conveying means conveys the original;

wherein said apparatus has an original discharge zone through any portion of which the original passes when being discharged;

wherein said apparatus has a portion extending into the discharge zone;

wherein said original guiding means is so disposed and so shaped that it non-nippingly guides the leading edge of the original being conveyed to prevent the leading edge of the original from catching on and being jammed by said portion of said apparatus; and wherein said original guiding means comprises a guide member having a concave surface as seen from said predetermined reading position.

17. An image reading apparatus according to claim 16, wherein said roller is provided at a position opposite to said means for reading.

* * * * *

UNITED STATES PATENT AND TRADEMARK OFFICE
CERTIFICATE OF CORRECTION

PATENT NO. : 4,920,431
DATED : April 24, 1990
INVENTOR(S) : Ogura, et al.

It is certified that error appears in the above-identified patent and that said Letters Patent is hereby corrected as shown below:

<u>Column 1</u>: Line 66,

"arrow;" should read --arrow f;--.

<u>COLUMN 7</u>:

Line 14, "provided a" should read --provided adjacent a--.

Line 32, "guide" should read --guides--.

Line 45, "provided a" should read --provided adjacent a--.

<u>COLUMN 8</u>:

Line 23, "provided a" should read --provided adjacent a--.

Signed and Sealed this

Eleventh Day of June, 1991

Attest:

HARRY F. MANBECK, JR.

*Attesting Officer*     *Commissioner of Patents and Trademarks*